(12) United States Patent
Sasmaz et al.

(10) Patent No.: US 11,712,689 B2
(45) Date of Patent: Aug. 1, 2023

(54) HIGH ACTIVITY PLATINUM AND NICKEL YOLK-SHELL CATALYSTS

(71) Applicant: UNIVERSITY OF SOUTH CAROLINA, Columbia, SC (US)

(72) Inventors: Erdem Sasmaz, Irvine, CA (US); Jochen Lauterbach, Columbia, SC (US); Sunkyu Kim, Irvine, CA (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/341,495

(22) Filed: Jun. 8, 2021

(65) Prior Publication Data
US 2021/0379575 A1 Dec. 9, 2021

Related U.S. Application Data

(60) Provisional application No. 63/035,881, filed on Jun. 8, 2020.

(51) Int. Cl.
| | | |
|---|---|---|
| *B01J 35/00* | (2006.01) | |
| *B01J 23/89* | (2006.01) | |
| *B01J 21/08* | (2006.01) | |
| *B01J 35/02* | (2006.01) | |
| *B01J 35/10* | (2006.01) | |

(Continued)

(52) U.S. Cl.
CPC ........... *B01J 35/0086* (2013.01); *B01J 21/08* (2013.01); *B01J 23/894* (2013.01); *B01J 35/023* (2013.01); *B01J 35/08* (2013.01); *B01J 35/1019* (2013.01); *C01B 3/40* (2013.01); *C01B 2203/1241* (2013.01)

(58) Field of Classification Search
CPC ...... B01J 35/008; B01J 35/0086; B01J 21/08; B01J 23/894; B01J 35/023; B01J 35/08; B01J 35/1014; B01J 35/1019; B01J 35/1057; B01J 35/1061; B01J 35/1066; C01B 3/40; C01B 2203/1241
USPC .......................................... 502/304, 324–355
See application file for complete search history.

(56) References Cited

U.S. PATENT DOCUMENTS

2012/0296124 A1* 11/2012 Asefa .................. B01J 37/0217
585/277

FOREIGN PATENT DOCUMENTS

| CN | 102716745 B | * | 6/2014 | ............ B01J 23/745 |
| CN | 104707597 A | * | 6/2015 | .............. B01J 23/44 |

(Continued)

OTHER PUBLICATIONS

Abdullah, et al. "Recent Advances in Dry Reforming of Methane over Ni-based Catalysts" *J. Clean. Prod.* 162 (2016) pp. 170-185.

(Continued)

*Primary Examiner* — Patricia L. Hailey
(74) *Attorney, Agent, or Firm* — Dority & Manning, P.A.

(57) ABSTRACT

The present disclosure relates to yolk-shell structured catalysts having compositions that can be particularly useful in the dry reforming of methane. These catalysts can demonstrate long-term stability that would be an advantage in industrial applications such as mitigating fossil fuel plant emissions. Example catalysts can include a yolk containing nickel (Ni) or nickel oxide (NiO), platinum (Pt) or platinum oxide ($PtO_2$), and a third material (M3) such as a cerium oxide ($CeO_x$). The shell can be formed of a ceramic such as silica and is generally a porous material that can support the yolk.

20 Claims, 10 Drawing Sheets

(51) Int. Cl.
*C01B 3/40* (2006.01)
*B01J 35/08* (2006.01)

(56) References Cited

FOREIGN PATENT DOCUMENTS

| CN | 104841449 | A | * | 8/2015 | |
|---|---|---|---|---|---|
| CN | 111276707 | A | * | 6/2020 | .......... H01M 4/8825 |
| KR | 101591640 | B1 | * | 2/2016 | ............. C01B 33/12 |
| WO | WO-2013160163 | A1 | * | 10/2013 | ............... B01J 23/38 |
| WO | WO-2017062226 | A1 | * | 4/2017 | ............... B01J 35/00 |
| WO | WO-2019175692 | A1 | * | 9/2019 | ............... B01J 35/00 |

OTHER PUBLICATIONS

Almana, et al. "Design of a core-shell Pt-$SiO_2$ catalyst in a reverse microemulsion system: Distinctive kinetics on CO oxidation at low temperature" *J. Catal.* 340 (2016) pp. 368-375.

Amin, et al. "Tri-reforming of methane for the production of syngas: Review on the process, catalysts and kinetic mechanism" *APCChE 2015 Chemeca* 3126379 (2015) pp. 1-9.

Ay, et al. "Dry reforming of methane over $CeO_2$ supported Ni, Co and Ni—Co catalysts" *Appl. Catal. B-Environ.* 179 (2015) pp. 128-138.

Bai, et al. "Enhancement of visible photocatalytic activity via Ag@$C_3N_4$ core-shell plasmonic Composite" *Appl. Catal. B-Environ.* 14, (2014) pp. 82-91.

Boden, et al. "Global, Regional, and National Fossil-Fuel $CO_2$ Emissions" *ORNL CDIAC* 1751-2006 (2009) pp. 1-2.

Cesario, et al. "Catalytic performances of Ni—CaO-mayenite in $CO_2$ sorption enhanced steam methane reforming" *Fuel Process. Technol.* 131 (2015) pp. 247-253.

Dahlberg, et al. "Synthesis of Ni@$SiO_2$ Nanotube Particles in a Water-in-Oil Microemulsion Template" *Chem. Mater.* 24 (2012) pp. 2635-2644.

Diez-Ramirez, et al. "Kinetic, energetic and exergetic approach to the methane tri-reforming process" *Int'l J. Hydrogen. Ener.* 41 (2016) pp. 19339-19348.

Donphai, et al. "Effect of Ni-CNTs/mesocellnlar silica composite catalysts on carbon dioxide reforming of methane" *Appl. Catal. A* 475 (2014) pp. 16-26.

EPA. "Greenhouse Gas Emissions: Overview of Greenhouse Gases" *US Envir. Prot. Agency* (2017) pp. 1-12.

EPA. "Inventory of U.S. Greenhouse Gas Emissions and Sinks: 1990-2015" *US Envir. Prot. Agency* 430-P-17-001 (2017) pp. 1-633.

Kang, et al. "Nickel-based tri-reforming catalyst for the production of synthesis gas" *App. Catal. A* 332 (2007) pp. 153-158.

Khajeh, et al. "A comparative study between operability of fluidized-bed and fixed-bed reactors to produce synthesis gas through tri-reforming" *J. Nat. Gas Sci. Eng.* 19 (2014) pp. 152-160.

Li, et al. "Highly Active and Stable Lanthanum-doped Core-Shell-structured Ni@$SiO_2$ Catalysts for the Partial Oxidation of Methane to Syngas" *ChemCatChem* 5 (2013) pp. 3781-3787.

Majewski, et al. "Tri-reforming of methane over Ni@$SiO_2$ catalyst" *Int'l J. Hydrogen Ener.* 39 (2014) pp. 12578-12585.

Singha, et al. "Synthesis and catalytic activity of Pd doped Ni—MgO catalyst for dry reforming of Methane" *J. Mater. Chem. A* 5 (2017) pp. 15688-15699.

Song, et al. "Tri-reforming of methane: a novel concept for catalytic production of industrially useful synthesis gas with desired $H_2$/CO ratios" *Catal. Today* 98 (2004) pp. 463-484.

Sun, et al. "Effect of $O_2$ and $H_2O$ on the tri-reforming of the simulated biogas to syngas over Ni-based SBA-15 catalysts" *J. Nat. Gas. Chem.* 19 (2010) pp. 369-374.

Urasaki, et al. "Synthesis gas production by catalytic partial oxidation of natural gas using ceramic foam catalyst" *Catal. Today* 299 (2018) pp. 219-228.

Velasco, et al. "Catalytic partial oxidation of methane over nickel and ruthenium based catalysts under low $O_2$/$CH_4$ ratios and with addition of steam" *Fuel* 153 (2015) pp. 192-201.

Wang, et al. "Syngas production from $CO_2$ reforming with methane over core-shell Ni@$SiO_2$ catalysts" *J. $CO_2$ Util.* 16 (2016) pp. 318-327.

Wei, et al. "Ni/Silicalite-1 coating being coated on SiC foam: A tailor-made monolith catalyst for syngas production using a combined methane reforming process" *Chem. Eng. J.* 327 (2017) pp. 465-473.

Yao, et al. "One-pot synthesis of core-shell Cu@$SiO_2$ nanospheres and their catalysis for hydrolytic dehydrogenation of ammonia borane and hydrazine borane" *Sci. Rep.* 4:7597 (2014) pp. 1-8.

Yu, et al. "Carbon dioxide reforming of methane over promoted $Ni_xMg_{1-x}O$ (1 1 1) platelet catalyst derived from solvothermal synthesis" *Appl. Catal. B* 148 (2014) pp. 177-190.

Zhang, et al. "Pd@C core-shell nanoparticles on carbon nanotube as highly stable and selective catalysts for hydrogenation of acetylene to ethylene" *Nanoscale* 9 (2017 pp. 14317-14321.

Zhang, et al. "New synthesis strategies for Ni/$Al_2O_3$-Sil-1 core-shell catalysts for steam reforming of methane" *Catal. Today* 236 (2014) pp. 34-40.

Zhang, et al. "Process simulation and optimization of methanol production coupled to tri-reforming process" *Int'l J. Hydrog. Ener.* 38 (2013) pp. 13617-13630.

Zhao, et al. "Design and synthesis of NiCe@m-$SiO_2$ yolk-shell framework catalysts with improved coke- and sintering-resistance in dry reforming of methane" *Int'l J. Hydrog. Ener.* 41 (2016) pp. 2447-2456.

* cited by examiner

HIGH ACTIVITY PLATINUM AND NICKEL YOLK-SHELL CATALYSTS

CROSS REFERENCE TO RELATED APPLICATION

This application claims filing benefit of U.S. Provisional Patent Application Ser. No. 63/035,881, having a filing date Jun. 8, 2020, which is incorporated herein by reference in its entirety.

FIELD OF THE INVENTION

The present disclosure relates to yolk-shell catalysts. More specifically, the present disclosure relates to yolk-shell catalysts that can be used in the dry reforming of methane.

BACKGROUND

Carbon dioxide is a primary greenhouse gas, and combustion of fossil fuels is the largest contributor of carbon dioxide emissions. Many approaches for reducing carbon dioxide emissions have been proposed, including hydrogenation, reforming, direct conversion via algae, mineralization, photoreduction, electroreduction, co-polymerization, as well as dry reforming processes. However, to date, there has not been wide deployment of dry reforming technology.

Dry reforming of methane (DRM) is of great interest from both a scientific and an industrial perspective. DRM employs a catalyst that can convert greenhouse gasses (e.g., $CO_2$ and $CH_4$) into syngas (CO and $H_2$). Landfill gas and biogas generated by anaerobic digestion of landfill and waste biomass are promising sources for DRM. The syngas produced by DRM can be further converted to valuable chemicals such as liquid hydrocarbons, e.g., methanol and dimethyl ether (DME), and oxygenates through various synthesis techniques such as Fischer-Tropsch processes.

However, still needed in the art are catalysts that can demonstrate improved stability and/or activity for DRM that could reduce operation costs to allow for wide-scale adoption of the technology.

BRIEF SUMMARY OF THE INVENTION

Aspects and advantages of embodiments of the present disclosure will be set forth in part in the following description, or may be learned from the description, or may be learned through practice of the embodiments.

Embodiments of the present disclosure include yolk-shell structured catalysts. The yolk can include a combination of nickel (Ni) or a nickel oxide (e.g., NiO) and platinum (Pt) or a platinum dioxide ($PtO_2$), as well as a third material (M3). The third material can include cerium. In one particular embodiment, the third material can be an oxide of cerium such as ceria ($CeO_2$). The shell can be a porous material that can support the yolk and can include ceramics such as silica, alumina, or aluminum silicates. In one particular embodiment, the shell can include only one ceramic such as only silica ($SiO_2$). The yolk-shell catalyst can take the form of various structures (e.g., nanotubes, rods, spheres) in which the yolk can be dispersed within the shell support in a substantially homogeneous fashion.

Interestingly, embodiments of the present disclosure can display highly stable reactivity in conditions used in dry reforming of methane (DRM) and can provide advantages to implementation in large-scale reforming processes. Example embodiments can demonstrate activity at relatively moderate temperatures (e.g., about 450° C. to about 550° C.) while maintaining stable conversion for over 80 hours. These properties can improve the coupling of DRM processes to powerplants or other industrial applications that generate carbon dioxide. Some embodiments can display undetectable or essentially undetectable coke formation which can greatly increase catalyst lifetime, reducing costs associated with catalyst replacement and/or regeneration, as well as the corresponding process downtime needed to replace the catalyst. Further, comparative examples demonstrate that both catalyst structure and composition can have a major effect on stability and conversion activity.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION OF THE INVENTION

Figure 1:
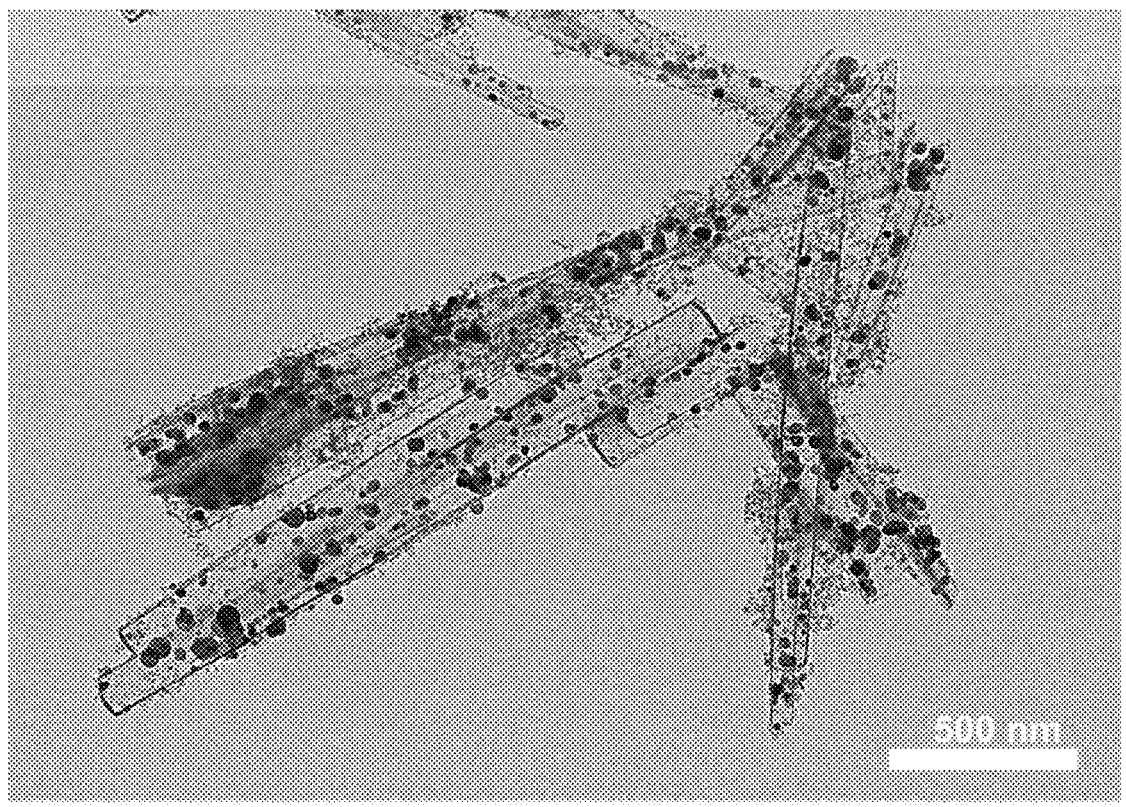
FIG. 1 is an example image of a yolk-shell catalyst according to an embodiment of the present disclosure.

Aspects and advantages of embodiments of the present disclosure will be set forth, in part, in the following description, or may be learned from the description, or may be learned through practice of the embodiments.

The present disclosure is directed to yolk-shell structured catalysts. The yolk-shell structures can be used to facilitate various reactions including the dry reforming of methane ($CH_4$) and carbon dioxide ($CO_2$). The yolks can include nickel (Ni) in the form of pure nickel or as an oxide (e.g., NiO) and platinum (Pt) in the form of pure platinum or as an oxide (e.g., $PtO_2$), and a third material (M3). The third material can include, for example, cerium (Ce), in the form of pure cerium or a cerium oxide ($CeO_x$). The shell is generally a porous material that can support the yolks. A yolk-shell catalyst can take any geometrical shape, such as the form of spherical or tube-like structures in which the yolk can be dispersed within the shell support in a substantially homogeneous fashion.

Ideally, a dry reforming process utilizes catalyst formulations that can withstand high reaction temperatures and/or coke formation. Coke formation can be a severe problem, particularly at certain feed gas compositions, such as high methane-to-carbon dioxide ratios. Deposited coke blocks the surface of active materials required for the reaction, which can decrease the catalyst life substantially. At high reaction temperatures or by using certain catalyst compositions and/or structures, catalysts can display deactivation by sintering and agglomeration. These observations have led to the development of improved catalysts that can display essentially undetectable coke formation, even at high methane:carbon dioxide ratio. Further, disclosed catalysts may demonstrate improved activity at temperatures below 750° C.

Yolk-shell catalysts of the present disclosure can withstand harsh conditions, avoid coke fouling, and operate for long periods without significant performance degradation. In the yolk-shell structure, the catalyst yolks (or cores) can be in the form of dispersed structures formed of an active catalytic material and can be retained within and surrounded by a porous shell material support.

The morphology of the yolk-shell catalyst can be tunable; for instance, by adjusting individual yolk particle size, shell porosity, and/or overall catalyst morphology (e.g., sphere, rod, tube, etc.), which can make the yolk-shell catalysts adaptable to reaction conditions. For example, the yolk-shell catalysts can be adapted to demonstrate long term stability (e.g., about 100 hours or more) for applications that involve continuous processing. For instance, industrial processes are generally designed to run continuously to maintain steady-state operating conditions for as long as possible and use of disclosed catalysts, which can decrease down-time necessary to regenerate and/or replace catalyst, can provide a significant improvement over existing systems, and in one embodiment, can provide a route to wider adoption of DRM for carbon dioxide emission reduction.

The yolk-shell catalysts of the present disclosure have been found to be particularly effective in converting carbon dioxide in a syngas formation process. As such, use of disclosed catalysts can be coupled to fossil fuel-fired power plants or other activities in which carbon dioxide would otherwise be released to the atmosphere. The production of syngas can be accomplished using a methane-containing feed gas (e.g., natural gas) in a DRM process. The catalyst can operate at various reaction conditions and can have high carbon dioxide conversion efficiency. The structure of the catalyst can provide excellent dry reforming activity and long catalyst life. Additionally, the cost of microemulsion methods described herein as may be utilized to form the catalysts are also comparable to or less expensive than other methods such as co-precipitation and wet impregnation. It should be understood, however, that formation methods of disclosed catalysts are not limited to microemulsion approaches described herein.

FIG. 1 shows an image of yolk-shell catalysts according to an embodiment of the present disclosure. As illustrated in FIG. 1, a yolk-shell structured catalyst can include one or more dispersed yolks shown as dark, substantially spherical dots enclosed within a shell, several of which are shown as translucent gray rods. FIG. 1 displays multiple yolks that are supported within each porous shell. The yolks can be distributed in a substantially homogenous fashion throughout the shell support, as shown. The yolk-shell structured catalyst can also include gaps (or voids) within each shell. The gaps within a yolk-shell structured catalyst can promote the flow of reactants within the catalyst structures and allow for high surface area contact between reactants and catalysts within each yolk-shell structure. However, large voids are not required in formation of the catalysts, and in some embodiments, the structures can exhibit a core-shell form, in which the yolk core(s) and the porous shell are in close interaction and gaps or voids are reduced or eliminated.

A porous shell can allow for reactants to penetrate the shell and contact the yolks, which provide the active sites of catalysis. A porous shell can also prevent coke formation from blocking the catalytically active sites on yolks.

The yolks can include nickel or a nickel oxide, platinum or a platinum oxide, and a third material (M3). The third material (M3) can include one or more metals or metalloids such as cerium (Ce), lithium (Li), sodium (Na), cesium (Cs), magnesium (Mg), calcium (Ca), titanium (Ti), zirconium (Zr), vanadium (V), yttrium (Y), manganese (Mn), rhenium (Re), gallium (Ga), germanium (Ge), tin (Sn), indium (In), cobalt (Co), gold (Au), silver (Ag), copper (Cu), ruthenium (Ru), rhodium (Rh), iridium (Ir), osmium (Os), palladium (Pd), and iron (Fe) or combinations thereof. In certain embodiments, the third material (M3) can be an oxide of a metal or metalloid, for instance, the third material can include a cerium oxide ($CeO_x$) such as ceria ($CeO_2$), optionally in combination with one or more other metals or metalloids, or oxides thereof. In one embodiment, the third material can include only a cerium oxide. In one embodiment, the yolk may include nickel, platinum, cerium, and oxygen only, with one or more of the nickel, platinum, and cerium present as an oxide.

Figure 2:
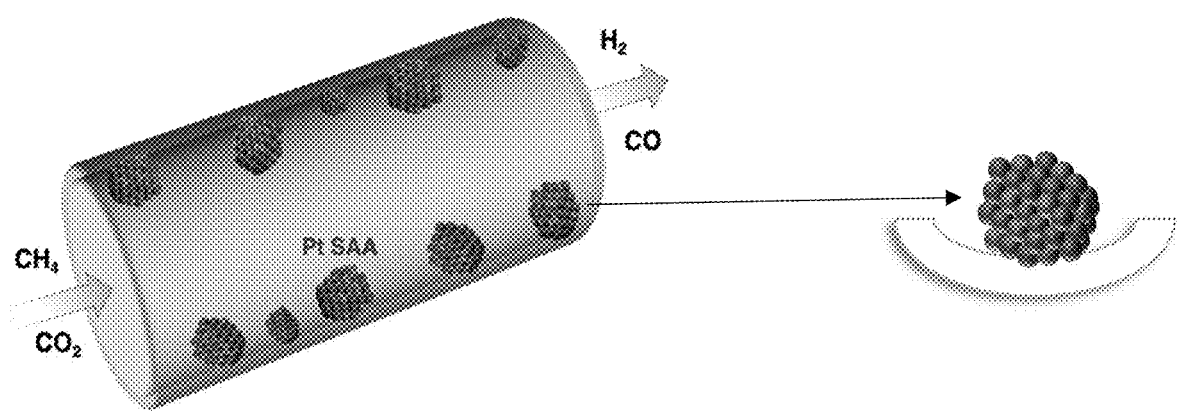
FIG. 2 schematically illustrates one embodiment of a yolk-shell catalyst according to an embodiment of the present disclosure.

In one embodiment, the yolk can include the platinum component in atomic form and the M3 component present as an oxide, e.g., ceria. For instance, a yolk can include atomic platinum, nickel, and cerium in the form of a single atom alloy (SAA) catalyst, including dispersed platinum atoms on the surface of the nickel/cerium containing yolk. FIG. 2 schematically illustrates one embodiment of such a catalyst including a plurality of yolks, each including atomic platinum dispersed on a nickel/cerium oxide particle, and contained within a silica shell. Without wishing to be bound to any particular theory, it is understood that such an SAA can exhibit high resistance to carbon deposition in the confined morphology of the single atom alloy forming the yolk particles due to efficient CO desorption. In contrast, a conventional impregnated catalyst can become deactivated rapidly by carbon formation and deposition through favorable Boudouard reaction during reactions, e.g., during DRM. Moreover, the interaction of atomic platinum and nickel of the yolk particles can enhance the reducibility of the nickel species, which can further suppress carbon formation during DRM. Thus, a synergetic combination of the confined morphology and the Pt—Ni SAA formation can provide for high resistance to carbon deposition by minimizing the effect of CO disproportionation and methane decomposition reactions, which can lower the operating temperature of a reformation process and increase stability of the catalyst activity.

An SAA can generally include the platinum and nickel components in an atomic ratio of about 0.01 or less, such as from about 0.005 to about 0.009, or about 0.008 (about 0.25 wt. % Pt with regard to the total catalyst) in some embodiments. Higher platinum loading should be avoided in some embodiments, as higher levels can lead to formation of a platinum nanoparticle rather than dispersed platinum atoms on the outermost surface of the nickel-based nanoparticles and can cause increased oligomerization of C—H species and undesirable coke formation.

The shell of the yolk-shell catalysts can include a porous ceramic such as silica, alumina, or aluminum silicates or combinations thereof. In one particular embodiment, the shell can include only one ceramic, such as silica ($SiO_2$).

The relative amount of the yolk portion of a yolk-shell catalyst can generally range from about 5 wt. % to about 25 wt. % of the total weight of the yolk-shell catalysts, such as from about 8 wt. % to about 20 wt. %, from about 12 wt. % to about 18 wt. %, or from about 14 wt. % to about 16 wt. % of the catalyst. The total amount of nickel and platinum combined (relative to the total weight of catalyst) can generally range from about 0.2 wt. % to about 15 wt. % of the catalyst, such as from about 1 wt. % to about 13 wt. %, from about 5 wt. % to about 11.5 wt. %, or from about 8 wt. % to about 10 wt. % of the catalyst. The total amount of platinum can generally range from about 0.05 wt. % to about 5 wt. %, such as from about 0.1 wt. % to about 1 wt. %, such as from about 0.15 wt. % to about 0.5 wt. %. The amount of the third material (M3) can generally range from about 0.1 wt. % to about 10 wt. % of the catalyst, such as from about 2 wt. % to about 8 wt. %, from about 3 wt. % to about 7 wt. %, or from about 3.5 wt. % to about 6.5 wt. % of the catalyst.

The yolk-shell catalyst can be porous in structure, allowing reactants to reach the reactive yolks that are housed within the shell. The pore sizes of the yolk-shell catalyst can be controlled. For example, a porous shell of a yolk-shell catalyst can have pore sizes ranging from about 1 nm to about 30 nm in cross section, such as from about 2 nm to about 25 nm in cross section, or from about 1 nm to about 5 nm in some embodiments.

The yolk-shell catalyst can take any geometric shape including, without limitation, spherical particles and tube-shaped particles. In those embodiments in which the yolk-shell particles are spherical, the spherical catalyst particles can have an average diameter ranging from about 5 nm to about 500 nm, such as from about 10 nm to about 130 nm.

Tube-shaped particles can provide for high surface area and can encourage penetration of reactants through the shell to reach the yolks. Methods of the present invention allow for the length and diameter of the tube-shaped catalysts to be controlled. For example, tube-shaped yolk-shell catalysts can have an average diameter ranging from about 5 nm to about 800 nm, such as from about 10 nm to about 300 nm, or from about 15 nm to about 100 nm. The average length of tube-shaped particles can be from about 0.1 µm to about 5 µm, such as from about 0.3 µm to about 3 µm, or such as from about 0.8 µm to about 1.5 µm. Further, tubular catalyst particles can generally have an aspect ratio (length/diameter) of from about 2 to about 50, such as from about 3 to about 20, or such as from about 5 to about 10.

The surface area of a yolk-shell catalyst can also be controlled, for instance by modification of parameters in a formation process, e.g., a reverse microemulsion formation process. For example, a yolk-shell catalyst can have a surface area density of from about 30 $m^2/g$ to about 600 $m^2/g$, such as from about 150 $m^2/g$ to about 500 $m^2/g$, or such as from about 250 $m^2/g$ to about 450 $m^2/g$. The size of the individual yolks within a yolk-shell catalyst can also be controlled. For example, the average cross-sectional dimension of individual yolks within a porous shell can generally range from about 0.5 nm to about 100 nm, such as from about 1 nm to about 50 nm, or such as from about 2 nm to about 40 nm.

In one embodiment, disclosed yolk-shell catalysts can be formed using a reverse microemulsion process. Microemulsions of a formation process can be thermodynamically stable and can occur spontaneously upon combination of the components and, as such, can be quite simple to form.

A reverse microemulsion approach for forming the yolk-shell catalysts can include forming one or more aqueous solutions including precursor materials for the nickel, platinum, and M3 components of the catalyst, thereby forming a combined aqueous mixture of the precursors. The aqueous mixture(s) can be combined with a non-aqueous solvent in conjunction with a surfactant to form a yolk mixture. For example, a first aqueous solution can include a nickel nitrate solution, a platinum chloride solution, or both. Optionally, a first aqueous solution can include a nickel nitrate and a separate aqueous solution can include a platinum chloride, and these two solutions can then be combined during a formation process. Another aqueous solution can include a precursor for the M3 component of the catalyst, e.g., a cerium nitrate solution. In yet another embodiment, separate aqueous solutions of each component can first be formed and all three combined together, or a single aqueous solution of all precursors, can be provided.

A surfactant can include, e.g., cetrimonium bromide (CTAB), though other surfactants as are known in the art can alternatively be utilized. A non-aqueous solvent can be non-polar such that the mixture of aqueous yolk precursors can form discrete domains within the non-polar solvent upon combination. For example, a non-aqueous solvent can include butanol and/or cyclohexane. A formation process can also include reduction of the precursor materials. For instance, a final yolk mixture can be formed upon addition of a reducing agent, e.g., a base such as hydrazine, sodium hydroxide, etc., or a combination thereof to a yolk mixture and heating of this mixture to a temperature of about 50° C. or greater, such as from about 60° C. to about 80° C., or about 70° C. to reduce the precursor materials and form an solution including the reduced and dispersed catalytic cores or yolks.

A yolk-shell mixture can be formed by combining an aqueous solution including a precursor of the shell material and a suitable reducing agent with a final yolk mixture. For example, a shell precursor solution can include tetraethyl orthosilicate (TEOS) as a silica precursor. A shell precursor solution can be combined with a final yolk mixture upon which yolk-shell catalyst structures can spontaneously form within the non-polar solvent of the final yolk mixture. The formation of the yolk-shell structures within discrete domains of the non-aqueous solvent can be facilitated by the surfactant of the final yolk mixture. Following formation of the individual structures, the solvent can be removed by, e.g., drying the resulting mixture, and the yolk-shell catalysts can be calcinated to form the porous ceramic shell.

Figure 3:
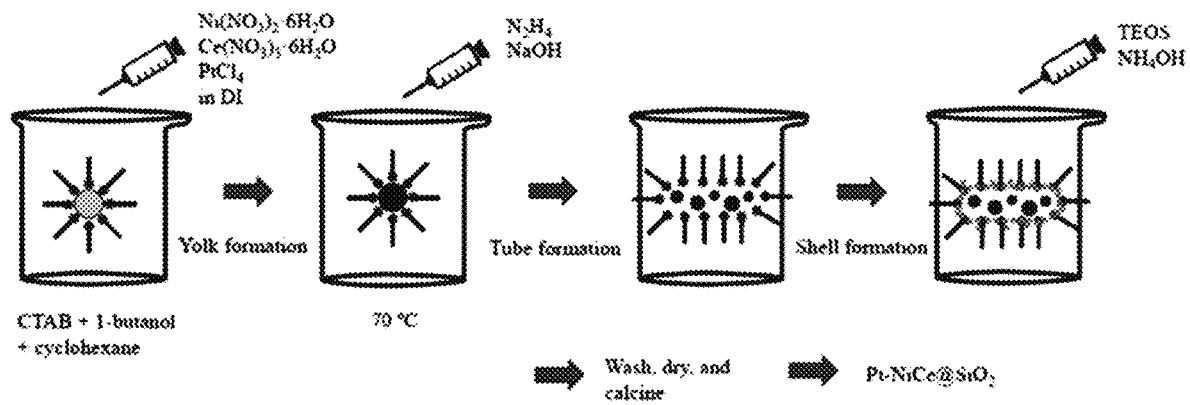
FIG. 3 illustrates an example process for forming yolk-shell catalysts according to an embodiment of the present disclosure.

FIG. 3 shows a specific example of such a reverse microemulsion process as may be used for forming yolk-shell catalyst structures of the present disclosure, which will be further discussed in Example 1.

A microemulsion process can provide a route to control multiple aspects of the formed catalysts. For instance, the overall size of yolk-shell structures (e.g., the length of cylindrical catalysts) can be controlled by aging a formation solution during synthesis. The width of individual cylindrical structures can be controlled by adjusting the water-to-surfactant ratio in a formation process. Thus, a combination of these two can be utilized to form spherical catalysts of a desired diameter. In addition, the concentration of precursors, e.g., a metal precursor, can be adjusted to control the overall shape of the catalysts, e.g., to produce either tube-like or spherical catalyst structures.

Figure 4:
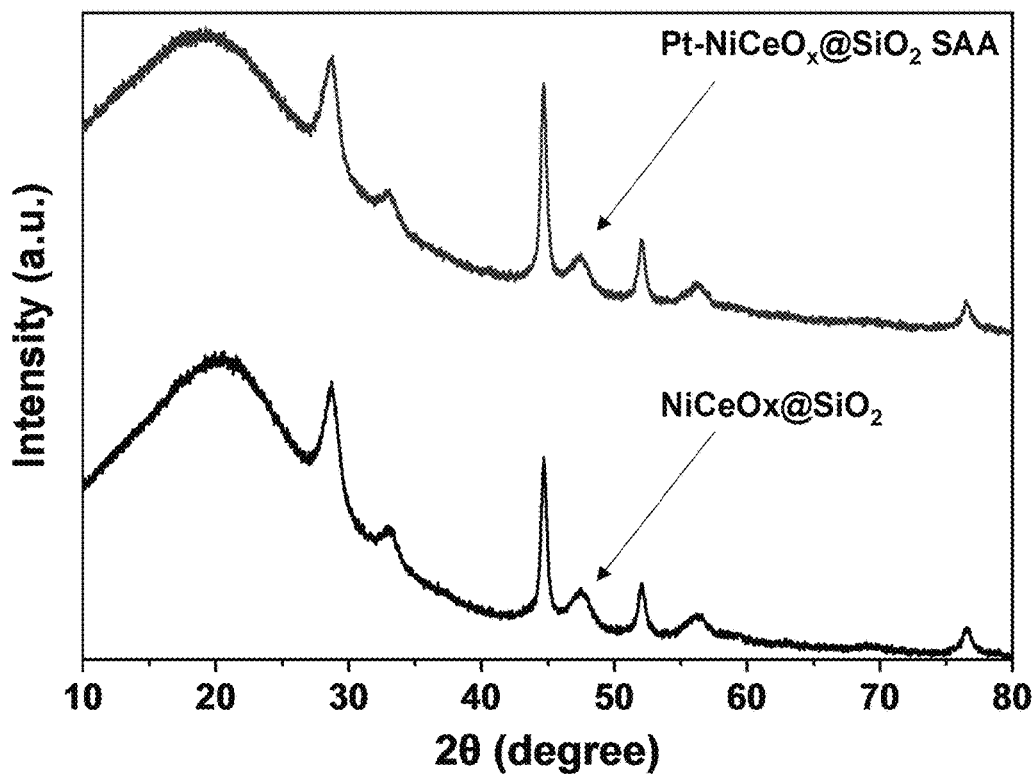
FIG. 4 illustrates an XRD spectrum for a yolk-shell catalyst according to the present disclosure compared to an XRD spectrum for a yolk-shell catalyst that does not include platinum (Pt) shown on top and below, respectively.
Figure 5:
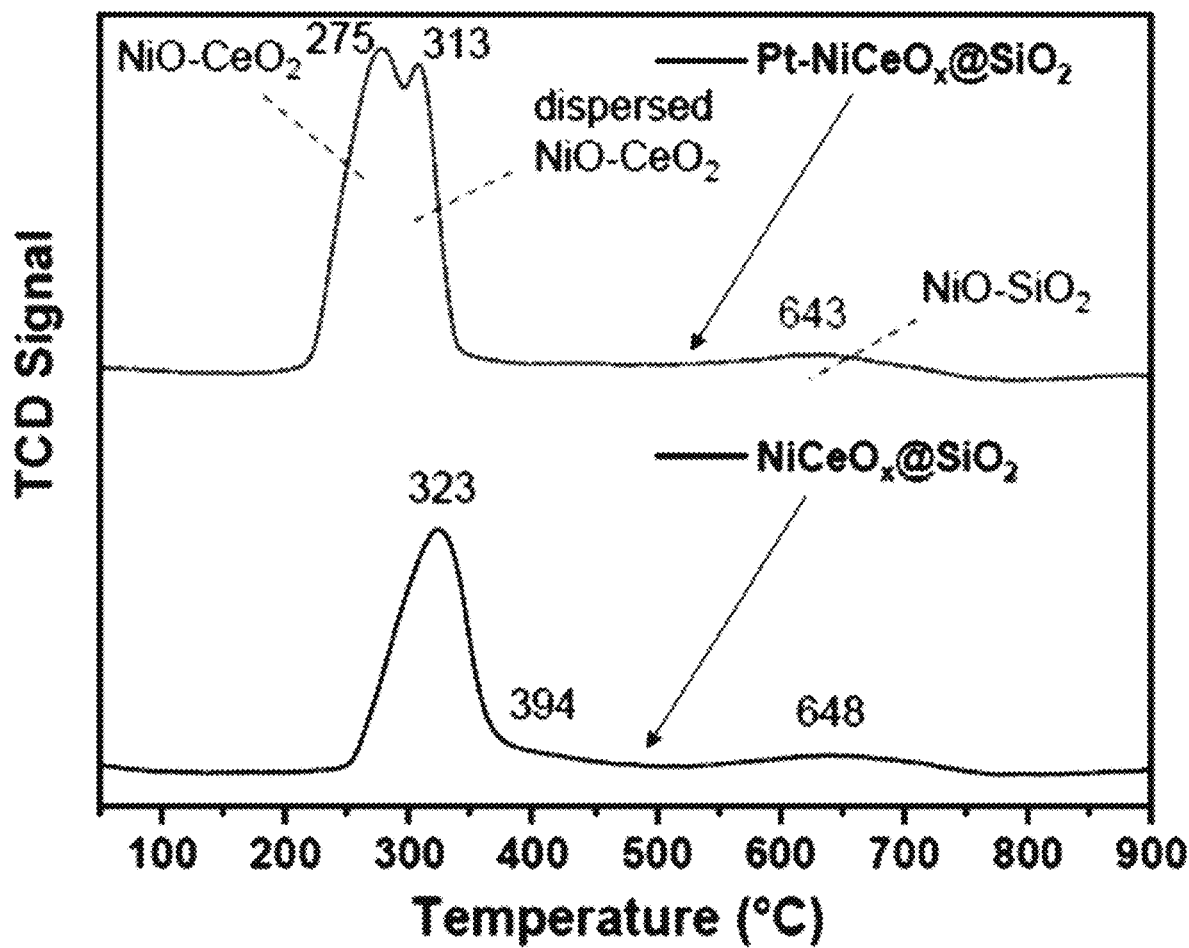
FIG. 5 illustrates the thermal conductivity for a yolk-shell catalyst according to the present disclosure compared to that of a yolk-shell catalyst without platinum (Pt) shown on top and below, respectively. The thermal conductivity detector (TCD) signal is displayed versus temperature.

Comparison of yolk-shell catalysts as disclosed with catalysts that are similar in composition but for the inclusion of platinum in the yolk is shown in FIG. 4 and FIG. 5. Specifically, FIG. 4 provides XRD spectra, and FIG. 5 provides hydrogen ($H_2$) temperature programmed reduction (TPR) data for the compared yolk-shell catalysts. As shown in FIG. 4, the XRD spectra indicates that the catalyst that incorporates all three of platinum, nickel, and cerium oxide exhibits improved characteristics as compared to the catalyst that does not include platinum in conjunction with nickel and cerium oxide. As shown in FIG. 5, the thermal conductivity (TCD) signal displays a shift to lower temperatures for the yolk-shell catalyst incorporating platinum. Without wishing to be bound to any particular theory, results are believed to indicate a lower barrier to reduction of nickel species by the disclosed catalyst.

Yolk-shell catalysts of the present disclosure can be employed in one embodiment in DRM processes. Aspects of example embodiments used in DRM are displayed in FIG. 6, FIG. 7, and FIG. 8. For instance, conversion of reactants (e.g., $CO_2$, $CH_4$) is generally stable and can be achieved at relatively low temperatures for DRM processes using disclosed catalysts. For certain implementations, conversion of $CO_2$ can be from about 5.0% to about 14%, such as from 7.5% to about 12.5%. Additionally, some implementations may demonstrate stable conversion of $CO_2$ at about 6.0% to about 10.0% for over 80 hours. Conversion of other reactants (e.g., $CH_4$) is generally stable and can also be achieved at relatively low temperatures for DRM processes.

Figure 6:
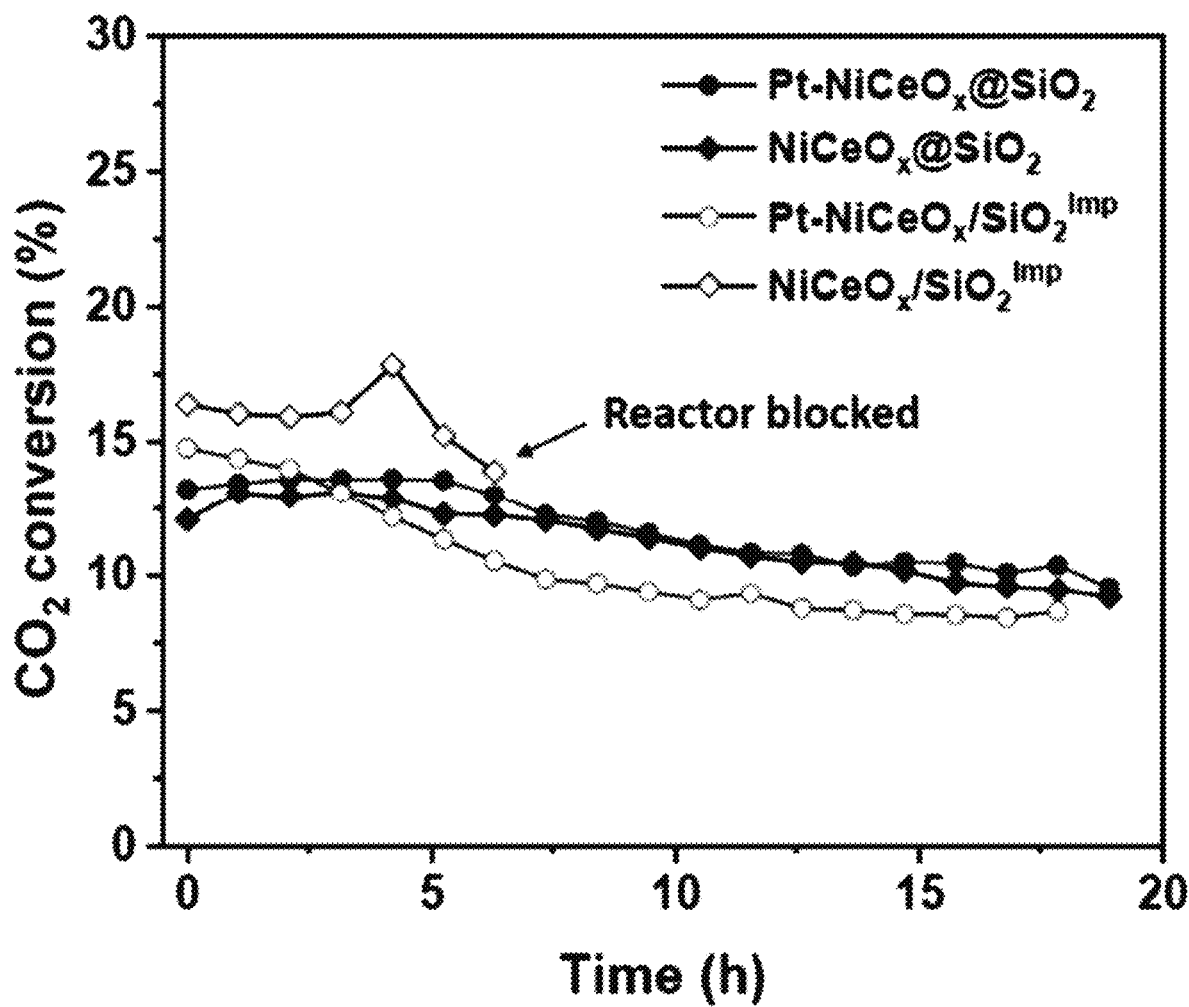
FIG. 6 illustrates $CO_2$ conversion measurements obtained during DRM at 500° C. for yolk-shell catalysts (@$SiO_2$) with and without platinum (Pt) compared with traditional impregnation catalysts (/$SiO_2^{imp}$) with and without platinum.

FIG. 6 presents a graph of $CO_2$ conversion in a DRM process over time using 4 different catalysts: a platinum-nickel yolk-shell catalyst in accordance with embodiments of the present disclosure (Pt—NiCeO$_x$@SiO$_2$); a comparative yolk-shell catalyst without any platinum (NiCeO$_x$@SiO$_2$); and two traditional impregnation catalysts having similar elemental compositions as the yolk-shell catalysts—one including platinum (Pt—NiCeO$_x$/SiO$_2^{Imp}$) and one with no platinum (NiCeO$_x$/SiO$_2^{Imp}$). The impregnation catalysts generally display poorer performance, especially over longer reaction times. As shown in FIG. 6, the impregnation catalyst with no platinum (NiCeO$_x$/SiO$_2^{Imp}$) is effectively deactivated after about 5 hours. No additional data was obtained for this catalyst as the reactor was effectively blocked and no conversion was observed. Yolk-shell catalysts displayed a $CO_2$ conversion between about 10% to about 15%, which was substantially stable over the time period displayed.

Figure 7:
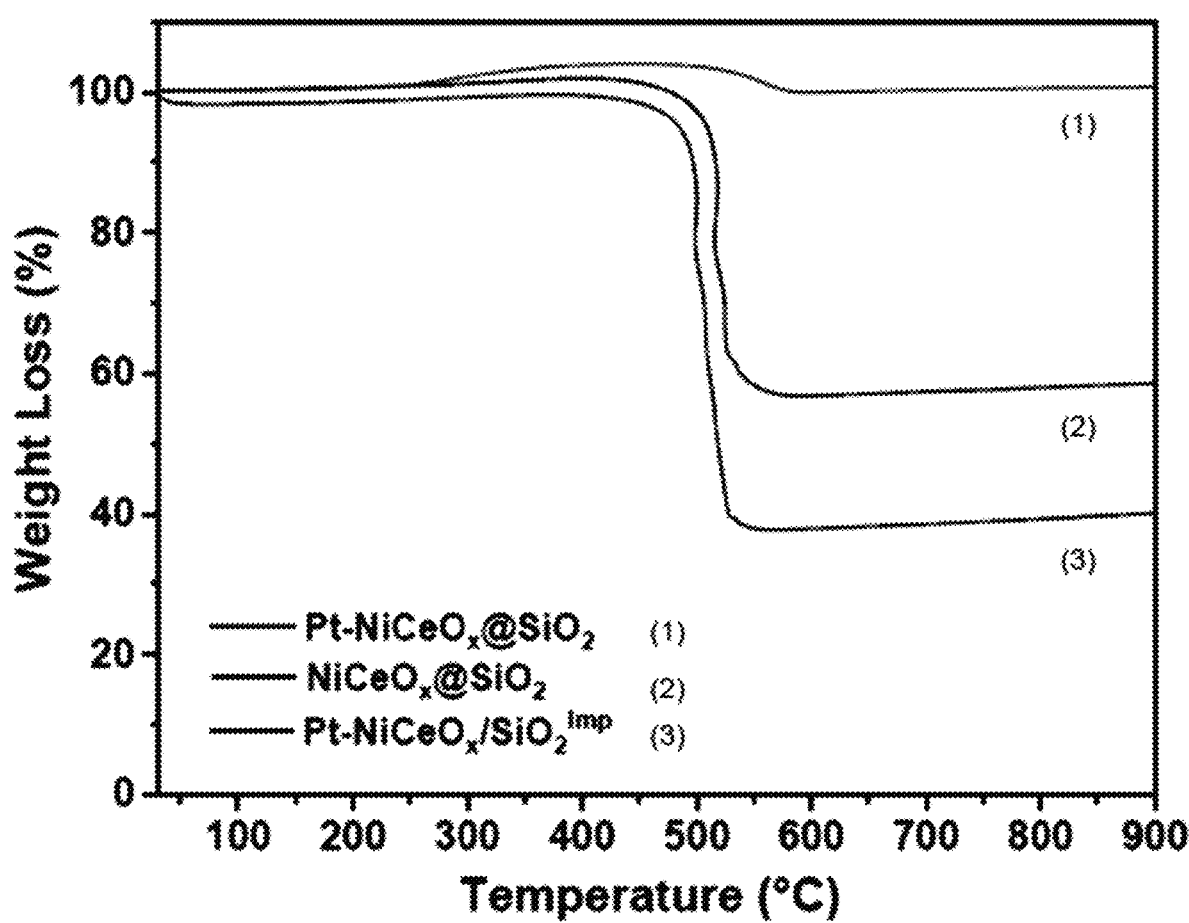
FIG. 7 presents thermogravimetric analysis (TGA) profiles for yolk-shell catalysts (@$SiO_2$) with and without platinum (Pt) compared with a traditional impregnation catalyst (/$SiO_2^{imp}$) that includes platinum. Each set of measurements were taken using spent catalysts obtained from a DRM process.

FIG. 7 provides a graph characterizing catalyst weight loss for catalysts that have been exposed to DRM conditions for the same period of time. Each of the catalysts was characterized by thermogravimetric analysis (TGA) to determine weight loss due to deposition of carbon. Specifically, catalyst compositions that were characterized in FIG. 6 were further characterized after being utilized in a DRM process carried out at 500° C. Each catalyst is identified used the legend designation as shown (i.e., 1 designates a yolk-shell catalyst including platinum included in the yolk composition, 2 designates a yolk-shell catalyst with no platinum, and 3 designates an impregnation catalyst including platinum). Since deposition of carbon can lead to catalyst deactivation, this test provided additional insight into the long-term stability of catalysts as used in DRM. Based on the data, the impregnation catalyst demonstrated the largest weight loss indicating a higher degree of carbon deposition and indicating lower catalyst performance. In contrast, the yolk-shell catalyst having the same composition displayed a lower weight loss and the yolk-shell catalyst including platinum in the yolk composition displayed no significant weight change. Thus, the TGA results help to confirm that catalysts having a yolk-shell structure demonstrate improved resistance to deactivation, and further, that the addition of platinum to the yolk provides a significant decrease in coke deposition.

Figure 8:
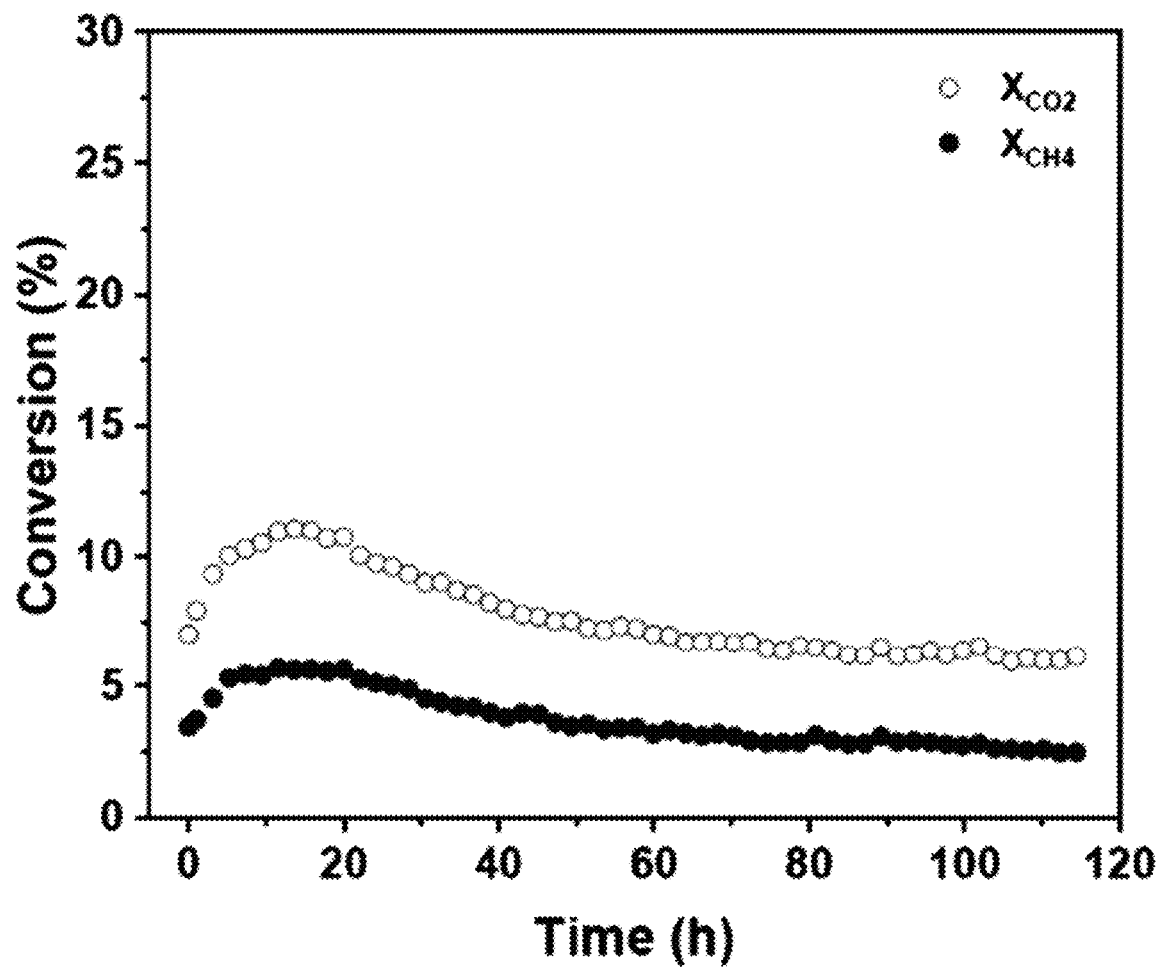
FIG. 8 illustrates a graph of $CO_2$ and $CH_4$ conversion data for a yolk-shell catalyst according to the present disclosure. Data were obtained regularly over 118 hours in a DRM process as one example demonstration of catalyst stability.

Given the almost undetectable level of coke formation as shown in FIG. 6 for the yolk-shell catalyst having platinum in the yolk, the same catalyst composition was subjected to a long-term stability test over 118 hours, with results shown in FIG. 8. After a startup period of approximately 20-30 hours, during which the reaction system reached steady state operation, catalyst activity displayed a highly stable conversion for both methane ($CH_4$) and carbon dioxide ($CO_2$) over a span of 100 hours, and the trend clearly indicates that stable conversion may be achieved for even longer durations.

Catalytic dry reforming can use carbon dioxide ($CO_2$) emissions directly from a combustion source, such as a coal or natural gas power plant; for instance, using natural gas as primary methane reactant. In the dry reforming process, the $CO_2$ content of a power plant flue gas can be converted to syngas (a mixture gas consisting of carbon monoxide (CO) and hydrogen ($H_2$)). In some embodiments, dry reforming can produce $H_2$ and CO in a molar ratio of about 1, and the resulting syngas can be used in one embodiment for production of liquid hydrocarbons and/or oxygenates.

In one embodiment, $CO_2$ emissions from a power plant can be utilized to produce syngas for use in Fischer-Tropsch processes and/or methanol, and dimethyl ether (DME) synthesis. As one example, to achieve a desired composition for downstream syntheses (e.g., a desired CO/$H_2$ molar ratio), control systems may be used to measure the amounts of hydrogen and/or carbon monoxide produced by the DRM process. Based on these measurements, a control system may transmit a signal to provide an additional reactant stream or to adjust the amount of a syngas component (e.g., CO or $H_2$) by accessing a stored quantity of the component. For instance, a tank storing CO may include a regulator that can be adjusted based on the concentration of carbon monoxide and/or hydrogen generated from a DRM process.

A DRM process utilizing disclosed catalysts can be carried out at a temperature ranging from about 350° C. to about 650° C., such as from about 400° C. to about 600° C., from about 450° C. to about 550° C., and from about 475° C. to about 525° C. (e.g., about 500° C.). In one embodiment, a feed gas composition going into a DRM reactor can range from about 10 wt. % to about 50 wt. % methane and from about 10 wt. % to about 50 wt. % carbon dioxide in separate or combined input streams. For instance, a single feed gas composition going into a DRM reactor can include from about 15 wt. % to about 40 wt. % methane and from about 15 wt. % to about 40 wt. % carbon dioxide. In one embodiment, a feed gas composition going into a DRM reactor can include from about 20 wt. % to about 25 wt. % methane, from about 8 wt. % to about 10 wt. % carbon dioxide, from about 10 wt. % to about 13 wt. % water, and from about 1.5 wt. % to about 2 wt. % oxygen. Additional gases such as nitrogen ($N_2$), noble gases, and water vapor ($H_2O$) can make up the balance of the gas composition for certain implementations. Alternatively, a feed gas composition may consist primarily of only methane and carbon dioxide, with only trace amounts, e.g., about 1 wt. % or less, of other components, e.g., about 99 wt. % or more of methane and carbon dioxide combined.

Figure 9:
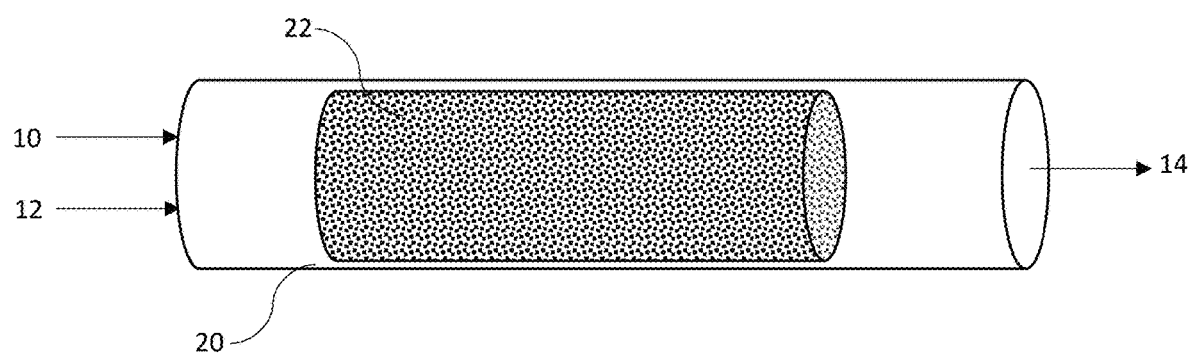
FIG. 9 schematically illustrates one embodiment of a DRM system as can incorporate a yolk-shell catalyst as disclosed herein.

One embodiment of a DRM system as can incorporate disclosed catalysts is illustrated in FIG. 9. As illustrated, a DRM process can include providing a first stream 10 containing methane and a second stream 12 containing carbon dioxide to a reactor 20. The reactor can carry the yolk-shell catalyst, for instance in a catalyst bed 22 that includes catalyst, e.g., carried on a suitable carrier material (e.g., inert beads or the like). Though illustrated as a horizontally aligned reactor 20, it will be understood that a reactor can be of any convenient size and orientation. Likewise, inlet streams 10, 12 can be fed separately to a reactor 20, as shown, or may be combined into a single inlet stream fed to a reactor, as is known.

A system can include a reactor 20 configured for continuous production, such as a tubular reactor having one or more inlets 10, 12, a catalyst bed 22 containing the yolk-shell catalyst, and an outlet 14. The reactor 20 can receive the first stream 10 and the second stream 12, and can be configured such that the reactants, as well as any generated reaction products, can flow through the catalyst bed 22, and reaction products and any unreacted inputs can exit at the outlet 14. A system may include other inlets and outlets as are known in the art, for instance for sampling the flow at different points along the reactor 20. A system can also include system controls, e.g., pressure and flow control, temperature control, etc., as are known in the art (not shown in FIG. 9).

Due to the stability of disclosed catalysts, systems that incorporate the catalysts, such as DRM systems, can operate for long periods without need to replace or regenerate the catalyst. For instance, a DRM system can operate continuously for a time period about 2 days or greater, such as about 3 days or greater, about 5 days or greater, about 7 days or greater, about 10 days or greater, or about 20 days or greater in some embodiments without need to replace or regenerate the catalyst bed 22.

For some embodiments, a DRM method can further include processing of an outlet stream 14. In general, outlet gas processing can be defined based on the compositions of the stream(s) exiting the reactor and the composition of the stream(s) entering the reactor (e.g., the product stream 14, the first stream containing methane 10, and the second stream containing carbon dioxide 12).

An exit stream 14 can include reaction products (e.g., CO and/or $H_2$), side products, unreacted inputs (e.g., $CO_2$ and/or $CH_4$), or substantially inert gases (e.g., $N_2$, Ar). In some embodiments, and depending on the compositions of the stream(s) entering a reactor and the stream(s) exiting the reactor, the conversion of carbon dioxide can be from about 6% to about 10%.

The present invention may be better understood with reference to the Examples, set forth below.

Example 1

A method as illustrated in FIG. 2 was utilized to form yolk-shell catalysts as disclosed. An aqueous solution of nickel nitrate ($Ni(NO_3)_2 \cdot 6H_2O$), cerium nitrate ($Ce(NO_3)_3 \cdot 6H_2O$), and platinum tetrachloride ($PtCl_4$) in deionized water (DI) was added dropwise to a mixture of cetrimonium bromide (CTAB) as surfactant, and a combination of 1-butanol and cyclohexane as solvent to form a yolk mixture. Time (approximately an hour) was allowed for yolks (or cores) to form in the yolk mixture. Hydrazine ($N_2H_4$) and sodium hydroxide (NaOH) were added to the yolk mixture and the yolk mixture was heated to 70° C. and allowed to set for approximately 2 hours to form the final yolk mixture including dispersed yolks of reduced catalytic materials.

Tetraethyl orthosilicate (TEOS) and ammonium hydroxide ($NH_4OH$) were added to the final yolk mixture to form a yolk-shell mixture. The TEOS acted as the silica source and upon addition, the silica formed the shells that encased the previously formed yolks. After the yolk-shell catalyst structures were allowed to form, the yolk-shell mixture was washed with DI water and ethanol, and dried overnight at a temperature of 100° C. The dried yolk-shell catalyst was then calcinated for 4 hours at 500° C. The platinum, nickel, and cerium content within the catalyst was determined to be 0.25 wt. %, 9.23 wt. % and 5.82 wt. % of the total weight of the catalyst, respectively.

Example 2

Aspects of the reverse microemulsion synthesize were varied to adjust catalyst properties. Table 1, below, lists the water to CTAB molar ratios examined and resulting average tube width, average particle size, and average surface area of the yolk-shell catalysts.

TABLE 1

| Water:CTAB (mol ratio) | Tube Width (nm) | Particle Size (nm) | Surface Area ($m^2/g$) |
|---|---|---|---|
| 12.6 | 125.5 | 24.8 | 400.3 |
| 18.9 | 176.1 | 20.0 | 366.9 |

Example 3

Figure 10:
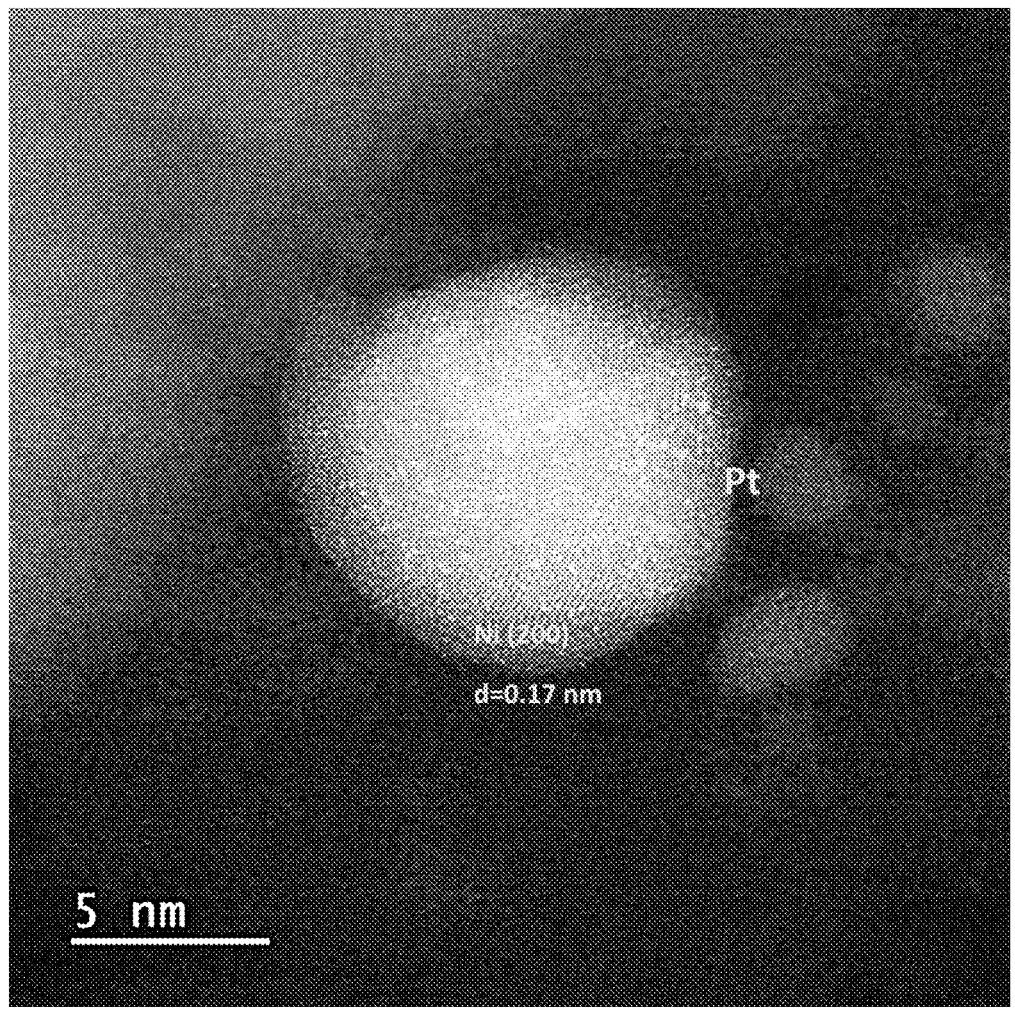
FIG. 10 presents a high-resolution image of a single yolk of a catalyst as disclosed herein.

SAA yolk-shell catalyst including a silica shell and Pt—$NiCeO_x$ yolk (Pt—$NiCeO_x@SiO_2$) were formed according to a method as described. As comparison, yolk-shell catalysts were formed lacking platinum ($NiCeO_x@SiO_2$). High-resolution AC-HAADF-STEM images (FIG. 10) of a reduced yolk formed with a Pt:Ni atomic ratio of 0.008 revealed the individual platinum atoms (three marked with arrows) on the yolk structure. The platinum atoms show with higher contrast than the surrounding lattice and confirmed the single atom alloy structure of the yolk.

Figure 11:
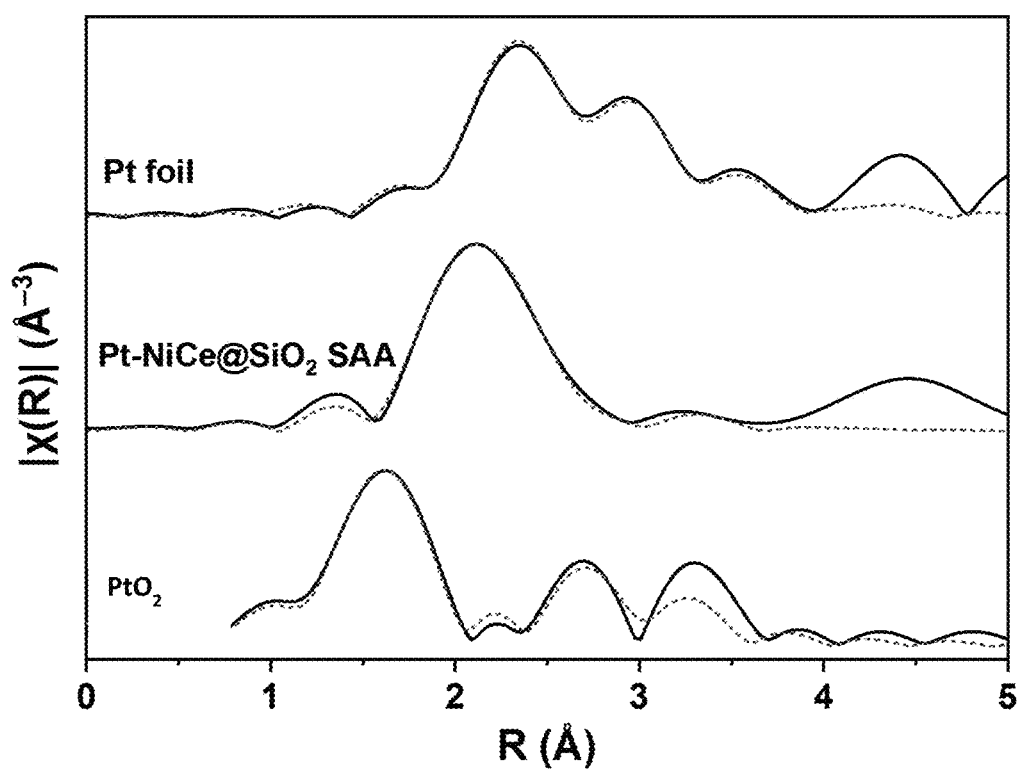
FIG. 11 presents $k^2$-weighted Fourier transforms of EXAFS spectra at Pt L3-edge for a catalyst as disclosed herein and compared to that of a platinum foil and a platinum oxide.

FIG. 11 illustrates $k^2$-weighted Fourier transforms of EXAFS spectra at Pt $L_3$-edge for the Pt—$NiCeO_x@SiO_2$ SAA catalyst (also described by Pt—$NeCe@SiO_2$). The fitting data are displayed in dashed lines. As shown, the Pt—$NiCeO_x@SiO_2$ SAA had a peak at 2.1 Å, which is located between Pt—O peak (1.6 Å) of $PtO_2$ (bottom) and Pt—Pt peak (2.4 Å) of Pt foil (top), and is attributed to the Pt—Ni bonds, suggesting the formation of isolated Pt atoms on Ni-based nanoparticles. Moreover, the yolk-shell Pt—NiCeO$_x$@SiO$_2$ shows completely different profiles as compared to the other materials.

Structural parameters obtained from the EXAFS fittings of the first shell at Pt L$_3$-edge for the Pt—NiCeO$_x$@SiO$_2$ SAA catalyst is provided in Table 2, below. (CN—coordination number, R—internal atomic distances, $\Delta E_0$—edge-energy shift, $\sigma^2$—Debye-Waller factor, R-factor—closeness of the fit.

TABLE 2

| Sample | Path | CN | R (Å) | $\Delta E_0$ (eV) | $\sigma^2$ ($10^{-3}$ Å$^2$) | R-factor |
|---|---|---|---|---|---|---|
| Pt foil | Pt-Pt | 12 | 2.76 ± 0.00 | 7.5 ± 0.5 | 3.8 ± 0.2 | 0.004 |
| PtO$_2$ | Pt-O | 6 | 2.02 ± 0.01 | 10.5 ± 1.2 | 1.2 ± 1.6 | 0.013 |
| SAA | Pt-Ni | 5.1 ± 0.6 | 2.53 ± 0.01 | 5.5 ± 1.4 | 6.4 ± 1.1 | 0.011 |

As shown in Table 2, the single peak obtained at Pt—NiCe@SiO$_2$ had a much lower bond length than that of Pt—Pt of the foil and much larger than that of Pt—O of the oxide. The fitting results demonstrates that the Pt—NiCeO$_x$@SiO$_2$ SAA has Pt—Ni shell with a coordination number (CN) of 5 at a bond distance of 2.53 Å. The low CN is possible if the atomically dispersed Pt atoms are located at the outermost layer of the nanoparticles without diffusing into the Ni bulk lattice.

Figure 12:
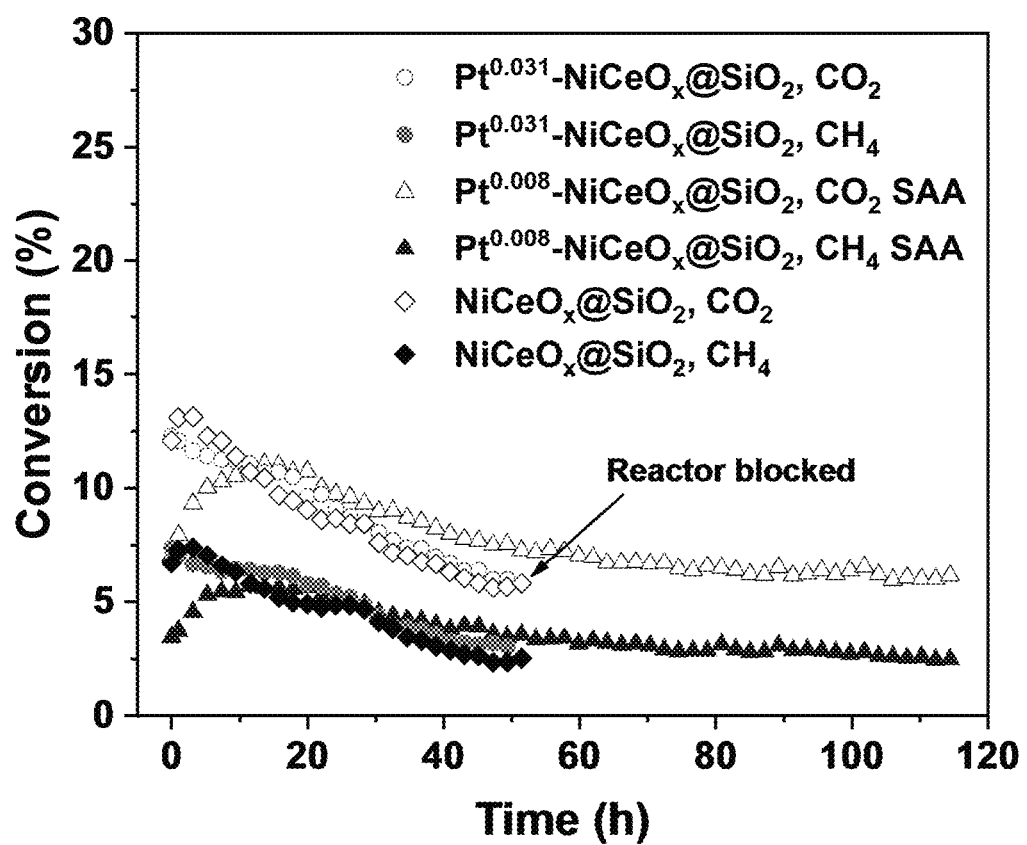
FIG. 12 presents a graph of DRM $CO_2$ and $CH_4$ conversion data for yolk-shell catalyst according to the present disclosure.

SAA catalysts with other atomic ratios of Pt:Ni were also formed. FIG. 12 presents conversion data of $CO_2$ and $CH_4$, as indicated, for a DRM process using a yolk-shell catalyst having a Pt:Ni atomic ratio of 0.031 (Pt$^{0.031}$—NiCeO$_x$@SiO$_2$), an SAA yolk-shell catalyst having a Pt:Ni atomic ratio of 0.008 (Pt$^{0.008}$—NiCeO$_x$@SiO$_2$) and two-component yolk-shell catalyst NiCeO$_x$@SiO$_2$. As shown, the SAA having an Pt:Ni atomic ratio of 0.008 showed the longest stability for the DRM conversion process.

Figure 13:
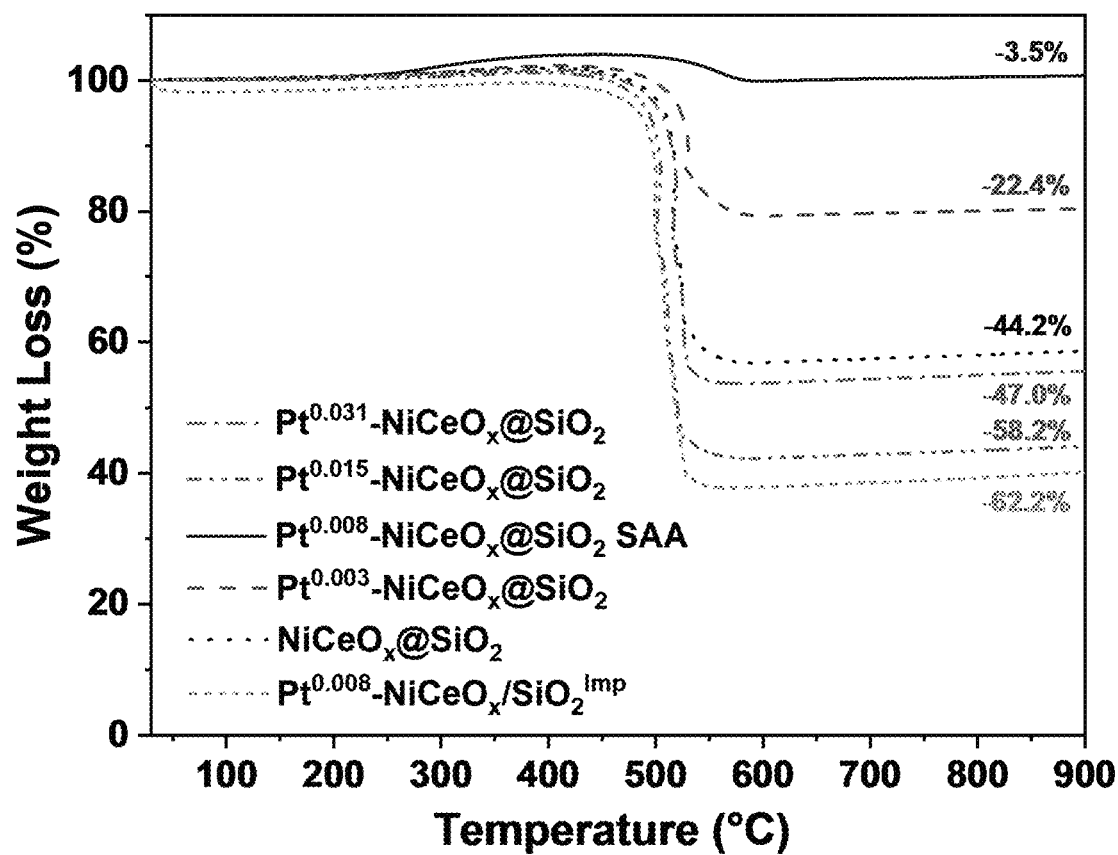
FIG. 13 presents TGA profiles for yolk-shell catalysts as disclosed including different platinum content and compared to a tradition impregnation catalyst (/SiO$_2^{imp}$) that included platinum. Each set of measurements were taken using spent catalysts obtained from a DRM process.

FIG. 13 presents TGA profiles of spent catalysts from a DRM process. The examined catalysts included those described in FIG. 12, as well as a yolk-shell catalyst having a Pt:Ni atomic ratio of 0.015 (Pt$^{0.015}$—NiCeO$_x$@SiO$_2$), a yolk-shell catalyst having a Pt:Ni atomic ratio of 0.003 (Pt$^{0.003}$—NiCeO$_x$@SiO$_2$), and a traditional impregnated catalyst including Pt:Ni at an atomic ratio of 0.008 (Pt$^{0.008}$-NiCeO$_x$/SiO$_2^{imp}$). As shown, the yolk-shell SAA catalyst having a Pt:Ni atomic ratio of 0.008 showed the highest resistance to carbon deposition.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A yolk-shell catalyst comprising:
    a plurality of particles, each particle comprising nickel, platinum, and a third material comprising a metal or a metalloid; and
    a porous shell that encapsulates the plurality of particles, wherein the catalyst comprises the platinum in the form of dispersed platinum atoms on a surface of each particle.

2. The yolk-shell catalyst of claim 1, wherein the third material comprises cerium (Ce), palladium (Pd), or iron (Fe).

3. The yolk-shell catalyst of claim 1, wherein the third material comprises a cerium oxide (CeO$_x$).

4. The catalyst of claim 1, wherein the porous shell comprises silica (SiO$_2$).

5. The catalyst of claim 1, wherein the particles comprise from about 5 wt. % to about 25 wt. % of the catalyst.

6. The catalyst of claim 1, wherein the total amount of nickel and platinum combined comprises from about 0.2 wt. % to about 15 wt. % of the catalyst.

7. The catalyst of claim 1, wherein the third material comprises from about 0.1 wt. % to about 10 wt. % of the catalyst.

8. The catalyst of claim 1, wherein the porous shell comprises pores having a size of from about 1 nm to about 30 nm in cross section.

9. The catalyst of claim 1, wherein the particles comprise spherical particles or cylindrical particles.

10. The catalyst of claim 9, wherein the spherical particles have an average diameter of from about 5 nm to about 500 nm.

11. The catalyst of claim 9, wherein the cylindrical particles have an average diameter of from about 5 nm to about 800 nm and/or an average length of from about 0.1 nm to about 5 nm and/or an aspect ratio (length/diameter) of from about 2 to about 50.

12. The catalyst of claim 1, wherein the catalyst has a surface area density of from about 30 m$^2$/g to about 600 m$^2$/g.

13. The catalyst of claim 1, wherein the catalyst comprises the platinum and the nickel in an atomic ratio of platinum-to-nickel of about 0.01 or less.

14. The catalyst of claim 1, wherein the third material is selected from the group consisting of cerium (Ce), lithium (Li), sodium (Na), cesium (Cs), magnesium (Mg), calcium (Ca), titanium (Ti), zirconium (Zr), vanadium (V), yttrium (Y), manganese (Mn), rhenium (Re), gallium (Ga), germanium (Ge), tin (Sn), indium (In), cobalt (Co), gold (Au), silver (Ag), copper (Cu), ruthenium (Ru), rhodium (Rh), iridium (Ir), osmium (Os), palladium (Pd), and iron (Fe) and combinations thereof.

15. The catalyst of claim 1, wherein the porous shell comprises a ceramic.

16. The catalyst of claim 15, wherein the ceramic comprises silica.

17. A method for reforming methane comprising contacting reactants including methane and carbon dioxide with the catalyst of claim 1.

18. A yolk-shell catalyst, the catalyst comprising:
    a plurality of particles, each particle comprising nickel, platinum, and a cerium oxide (CeO$_x$); and
    a porous shell comprising silica encapsulating the plurality of particles.

19. The yolk-shell catalyst of claim 18, wherein the catalyst comprises the platinum in the form of dispersed platinum atoms on a surface of each particle.

20. A yolk-shell catalyst comprising:
    a plurality of particles, each particle comprising nickel, platinum, and a third material comprising a cerium oxide (CeO$_x$); and
    a porous shell that encapsulates the plurality of particles.

* * * * *